UNITED STATES PATENT OFFICE 2,284,860

RESINOUS DERIVATIVES FROM CELLULOSE AND OTHER SUBSTANCES AND ALCOHOLS

Eduard Färber, New Haven, Conn., assignor to Polyxor Chemical Co., Inc., New Haven, Conn., a corporation of New Jersey No Drawing. Application April 27, 1939, Serial No. 270,425

9 Claims. (Cl. 260—9)

My invention relates to certain resinous derivatives produced from, on the one hand, cellulose and substances which commonly accompany cellulose in nature (for example, pentosans) and, on the other hand, an alcohol.

Unless heated above moderately high temperatures, say to about 180° C. or over, these derivatives are soluble in many organic solvents, such for example as alcohols and ketones like acetone, and in this soluble form are adapted for use as coatings or varnish. By heating to higher temperatures, say to above 180° C., they become insoluble with respect to these solvents. Coatings for example can be rendered so insoluble by heating to such higher temperature after being applied to the surface to be protected thereby, or the transformation can be used to produce similarly insoluble articles molded from the plastic or soluble form of the derivative.

These derivatives are generally of a rather dark color. They possess certain advantages over other resinous materials; for example, they possess a generally unusually high degree of resistance to acids and alkaline liquids.

Briefly, I have discovered that cellulose and those substances which commonly are found with cellulose will react with an alcohol to form these resinous derivatives, when substantially concentrated sulphuric acid is present in small amounts, and the water of the reaction is removed; the sulphuric acid appears to act as a catalyst and partly as a sulphonating agent.

As an example of my process for producing these resinous derivatives in soluble form, I may take one hundred parts by weight of cellulose (or sufficient cellulose-containing material to provide one hundred parts of chemically pure cellulose), thoroughly distribute through the cellulose four and one-half parts by weight of substantially concentrated (e. g. 95% to 100%) sulphuric acid as by spraying the acid in a very finely divided state throughout the cellulose, then mix with these components one hundred and ten parts by weight of amyl or isoamyl alcohol, and remove, say substantially as rapidly as formed, the water which is a product of the reaction. An elevated temperature hastens the reaction and brings it more quickly to its conclusion; furthermore, the water of the reaction can be driven off as formed by holding the mixture at a temperature above the boiling point of water. Preferably therefore I heat the mixture to and hold it at a temperature as reasonably high as possible but (since this example assumes the production of the derivative in its quite soluble form) well below the temperature which renders the derivative insoluble; that is to say, preferably I hold the temperature of this mixture at about 150° C. Further, since this temperature is above the boiling point of the chosen alcohol, I usually subject such a mixture, during the reaction, to a pressure sufficient to raise the boiling point of the alcohol to above the chosen temperature but not high enough to prevent the vaporization of the water, say a pressure of about fifty pounds per square inch; that is to say, I heat the mixture in a closed vessel from which the water vapor is allowed to escape at this pressure. This elevated pressure prevents excessive loss of the alcohol. The completion of the reaction is indicated by the disappearance of the cellulose. The resulting mass is the desired derivative.

As before indicated, I prefer to use cellulose, a cellulose-containing material, a pentosan, or a pentosan-containing material, or a mixture thereof, for the basic raw material.

Also as before indicated, only a very small quantity of the sulphuric acid is required; usually less than five parts by weight to one hundred parts by weight of the (chemically pure) cellulose (and/or other basic raw material) are sufficient; usually I use between two parts and four and one-half parts of the acid to that quantity of the base material (e. g. cellulose). Greater quantities of the acid can be used however, say up to six parts to one hundred parts of the base material by weight, especially when the (e. g.) cellulose-containing materials contain mineral impurities. The sulphuric acid should be thoroughly distributed throughout the basic raw material. Especially when very small quantities of acid are employed, this may be done by spraying the acid, in finely divided form, into and throughout this base material as in the example above. In the alternative, the acid may be incorporated in a non-aqueous carrier, and mixed in this form, either with the base material (cellulose or pentosan) alone or, say, after the addition of the alcohol; a sufficient volume of such carrier or solvent is used to assist or produce the thorough distribution of the acid desired. Such a carrier should be a material that does not react with the acid, at least to an inhibitive degree; that does not effectively inhibit the main reaction; and that does not deleteriously affect the reaction product materially. Acetic acid is especially suitable for such a carrier or solvent since it wets suitable base material readily. Fine emulsions of the acid in liquids that do not dissolve the acid can be used, such for example, as emulsions with chlorinated hydrocarbons or nitrobenzole.

The alcohol can be substantially any aliphatic alcohol; preferably however I use an alcohol of not less than four carbons and not more than eight carbons, per molecule; it can be a primary, secondary or tertiary alcohol, and it can be a mono-hydroxy or a polyhydroxy alcohol. It can be a mono-hydroxy or polyhydroxy benzene derivative. It can be a mixture of any of these. The quantity of the alcoholic material needed for the reaction in any instance is of the order of from one-and-one-half to three gram-molecules of the alcoholic material to one gram-molecule of the (chemically pure) cellulose and/or its accompanying substances; usually I use about two gram-molecules to such quantity of the basic raw material; greater quantities can be included in the mixture however, either to make up for wastage during the reaction, to procure a final product in the form of a liquid thinner than otherwise, or for some other purpose. It will be understood of course (as indicated elsewhere herein) that in thus referring to the gram-molecular weights of the basic raw materials (the molecular structures of which are complex), I am referring, as customary, to weights which are based on the simplest or empirical formulae of those materials; thus for example, the gram-molecular weight of cellulose herein referred to is 162, and of pentosans is 132. In the event that a cellulose- or pentosan-containing material also contains a substantial amount of lignin, the lignin can be counted as cellulose in determining the quantity of the alcohol.

As before indicated, I usually heat the mixture to hasten the reaction, and also as a means of removing the water of the reaction as this water is formed. Where the derivative is desired in the readily soluble form, the reaction is carried on at a temperature below that at which the insoluble form is produced, say below 200° C.; if the relatively insoluble form is desired initially, the reaction is carried on at a sufficiently higher temperature, say at or above 200° C. Where, as before indicated, the alcohol has a boiling point which is rather low with respect to the temperature desired to hasten the reaction (or to remove the reaction water, or to produce the relatively insoluble derivative) an elevated pressure can be used to prevent the loss, or an undue loss, of the alcohol, at the same time the pressure being maintained sufficiently low to permit the escape of the water if desired. In the event that the relatively insoluble reaction product is desired in the first instance and the reaction is carried on at an adequately high temperature to secure that result, say a temperature about or above 180° C. or 200° C., phenol serves particularly well as the alcohol because its rather high boiling point permits the use of lower pressures.

To avoid odors in the finished derivative, such as may be due to residues or uncombined alcohol or phenol for example, equivalent small amounts of an aldehyde can be added to the mass near the end of the reaction. For example, furfural or glucose can be used for this purpose.

Where the derivative is produced initially in its soluble form, it can be transformed into its relatively insoluble form thereafter by heating to the appropriate temperature, say somewhat above 200° C., for example as an incident to or as a separate step in the manufacture of articles molded from its soluble form, or after being applied as a coating as before pointed out.

The particular temperature at which the soluble form of resinous product is converted into the insoluble, depends somewhat generally speaking, on the particular kind of alcohol that is or has been used. This will be borne in mind where particular temperatures are referred to above.

As before indicated, the resinous derivatives of my process generally have a dark color and are highly resistant to the action of acids and, in the insoluble form, alkaline liquids. They react with chlorine or with nitric acid and can be acetylated. Their electrical resistance is high.

I claim:

1. The method of producing a resinous derivative which consists in forming a mixture of at least one material selected from the group consisting of cellulose and pentosans, a relatively small quantity of sulphuric acid but a quantity thereof which in weight does not exceed about six percent of the weight of the material of said group, and an alcohol, there being at least about one-and-one-half gram molecules of alcohol to each gram molecule of the material of said group, permitting the same to react, and removing water of the reaction substantially as formed to permit the reaction to continue until the material of said group has substantially disappeared.

2. The method of claim 1, characterized by the fact that said alcohol is an alcohol of more than three and less than nine carbons per molecule.

3. The method of producing a resinous derivative which consists in mixing at least one material selected from the group consisting of cellulose and pentosans with a relatively substantial quantity of sulphuric acid but a quantity thereof which in weight does not exceed about six percent of the weight of the material of said group, thereafter mixing therewith an alcohol in proportions of at least about one-and-one-half gram-molecules of alcohol to each gram-molecule of the material of said group, permitting the mixture to react, and removing water of the reaction substantially continuously as that water is formed to permit the reaction to continue until the material of said group has substantially disappeared.

4. The method of claim 3, characterized by the fact that the quantity of sulphuric acid, by weight, is between about two and five percent of the weight of the material of said group, the alcohol is an alcohol of more than three and less than nine carbons per molecule, and the alcoholic proportions are between about one-and-one-half and about three gram-molecules of alcohol to one gram-molecule of the material of said group.

5. The method of claim 1, characterized by the fact that heat is applied to the mass to maintain the temperature thereof above 100° C. and the mass is maintained under a pressure sufficiently high to prevent substantial loss of the alcohol at the temperature of the mass but less than sufficient to prevent the vaporization of the water at said temperature, the water being removed by permitting the escape of the water vapor produced.

6. The method of claim 1, characterized by the fact that the water of the reaction is removed by applying heat to the mixture to hold the temperature of the mixture well above the boiling point of the water at the pressure at which the reaction is carried on, whereby the water escapes in the form of vapor substantially as rapidly as formed.

7. The method of claim 3, characterized by the fact that the quantity of sulphuric acid, by weight, is of the order of from two percent to five percent of the weight of the material of the said group, and by the fact that the water of the reaction is removed by applying heat to the mixture to hold the temperature of the mixture well above the boiling point of the water at the pressure at which the reaction is carried on, whereby the water escapes in the form of vapor substantially as rapidly as formed.

8. The method of claim 1, characterized by the facts that at least the major part of the material of said group is cellulose, the quantity of the sulphuric acid, by weight, is of the order of from two percent to five percent of the weight of the material of said group, and for each one hundred sixty-two parts by weight of the material of said group, there is about, by weight, from one-and-one-half to three gram-molecules of the alcohol.

9. The method of claim 1, characterized by the facts that a large part of the material of said group is a pentosanic material, the quantity of the sulphuric acid, by weight, is of the order of from two percent to five percent of the weight of the material of said group, and for each one hundred thirty-two parts by weight of the material of said group there is about, by weight, from one-and-one-half to three gram-molecules of the alcohol.

EDUARD FÄRBER.